United States Patent
Herzig et al.

(10) Patent No.: US 7,582,700 B2
(45) Date of Patent: Sep. 1, 2009

(54) METHOD FOR THE PRODUCTION OF EMULSIONS OF HIGHLY-VISCOUS ORGANOPOLYSILOXANES

(75) Inventors: Christian Herzig, Waging (DE); Siegfried Dormeier, Stubenberg (DE)

(73) Assignee: Wacker Chemie AG, Munich (DE)

( * ) Notice: Subject to any disclaimer, the term of this patent is extended or adjusted under 35 U.S.C. 154(b) by 418 days.

(21) Appl. No.: 11/572,616

(22) PCT Filed: Jul. 28, 2005

(86) PCT No.: PCT/EP2005/008246

§ 371 (c)(1), (2), (4) Date: Jan. 24, 2007

(87) PCT Pub. No.: WO2006/015740

PCT Pub. Date: Feb. 16, 2006

(65) Prior Publication Data

US 2008/0033062 A1    Feb. 7, 2008

(30) Foreign Application Priority Data

Aug. 5, 2004    (DE) .................. 10 2004 038 148

(51) Int. Cl.
*C08L 83/08* (2006.01)
(52) U.S. Cl. ............... 524/838; 524/837; 525/477; 528/34; 528/38
(58) Field of Classification Search ............... None
See application file for complete search history.

(56) References Cited

U.S. PATENT DOCUMENTS

| | | | |
|---|---|---|---|
| 3,658,864 A | 4/1972 | Golitz | |
| 5,000,861 A * | 3/1991 | Yang | ............... 428/391 |
| 5,039,724 A | 8/1991 | Demlehner et al. | |
| 5,241,034 A | 8/1993 | Herzig et al. | |
| 5,302,659 A | 4/1994 | Bindl et al. | |
| 5,403,886 A * | 4/1995 | Chrobaczek et al. | ........ 252/8.63 |
| 6,090,885 A * | 7/2000 | Kuo et al. | ............... 524/838 |
| 6,248,855 B1 * | 6/2001 | Dalle et al. | ............... 528/26 |
| 6,252,100 B1 | 6/2001 | Herzig | |
| 6,451,909 B1 | 9/2002 | Herzig et al. | |
| 6,610,782 B1 * | 8/2003 | Weiland | ............... 524/837 |
| 2005/0131243 A1 | 6/2005 | Herzig et al. | |
| 2006/0280716 A1 * | 12/2006 | Czech et al. | ............ 424/70.122 |

FOREIGN PATENT DOCUMENTS

| | | |
|---|---|---|
| DE | 1 905 101 | 8/1970 |
| DE | 25 00 020 A1 | 7/1976 |
| EP | 0 366 133 A2 | 5/1990 |
| EP | 0 563 962 A1 | 10/1993 |
| EP | 0 874 017 A2 | 10/1998 |
| EP | 0 908 498 A2 | 4/1999 |
| EP | 1 541 615 A1 | 6/2005 |

OTHER PUBLICATIONS

English Abstract corresponding to EP 0 908 498 A2, (1999).
English Abstract corresponding to DE 25 00 020 A1, (1976).

* cited by examiner

*Primary Examiner*—Marc S Zimmer
(74) *Attorney, Agent, or Firm*—Brooks Kushman P.C.

(57) ABSTRACT

Emulsions of highly viscous organopolysiloxanes are prepared by reacting organopolysiloxanes having at least one Si—OH group with alkoxysilanes bearing a group $BR_eSi(OR^3)_{3-e}$ wherein R is a hydrocarbon radical and B is a radical —$CR^2{}_2$—Y where Y is halogen, monosubstituted O or S or substituted N or P, the reaction taking place as a dispersion in water, optionally in the presence of an emulsifier.

17 Claims, No Drawings

METHOD FOR THE PRODUCTION OF EMULSIONS OF HIGHLY-VISCOUS ORGANOPOLYSILOXANES

CROSS-REFERENCE TO RELATED APPLICATION

This application is the U.S. national phase of PCT Appln. No. PCT/EP2005/008246 filed Jul. 28, 2005 which claims priority to German application 10 2004 038 148.8 filed Aug. 5, 2004.

BACKGROUND OF THE INVENTION

1. Field of the Invention

The invention relates to a process for preparing emulsions of highly viscous organopolysiloxanes. The invention further relates to emulsions of highly viscous organopolysiloxanes.

2. Description of the Related Art

For the preparation of polysiloxanes having high viscosity, a series of methods exists, which are based mainly on condensation reactions. For instance, a standard method is to prepare silanol-functional highly viscous polysiloxanes from low-viscosity hydrolysates of the chlorosilanes, usually dimethyldichlorosilane, by condensing them to form water at relatively high temperature, usually under the action of acidic catalysts. Such condensations proceed only slowly and incompletely in aqueous emulsion, such that an increase in viscosity of the siloxane raw materials used only occurs to a modest degree. This method cannot be used at all for the preparation of emulsions of highly viscous amine oils.

In a similar manner, silanol-functional polysiloxanes can be condensed with methoxysilanes to form methanol. For this purpose, relatively high temperatures and catalysts are usually required in order to achieve industrially acceptable conversion rates. For instance, the standard process for preparing amino-functional siloxanes typical for the market is the base-catalysed condensation of aminoalkyl methoxysilanes with a short-chain hydrolysate of dimethyldichlorosilane at elevated temperature.

In view of the reaction temperatures of 100° C. and higher, and the reaction time over several hours, this process for preparing emulsions of highly viscous polysiloxanes is unsuitable, particularly when the continuous phase of the emulsion is water. In this case, it is in fact possible in principle for relatively highly viscous organopolysiloxanes first to be prepared and then be emulsified. Depending on the mechanical design, the emulsification process itself is limited to oils with not too high a viscosity such that organopolysiloxanes with more than 50,000 mPa·s at 25° C. can scarcely be emulsified with acceptable properties, and an economically viable procedure requires products with, if anything, less than 30,000 mPa·s viscosity at 25° C.

DE-A 2500020 describes a process for preparing aminosiloxanes, in which silanol-terminated polysiloxanes are reacted with α-aminosilanes which bear an alkoxy group. The reaction proceeds at moderate temperatures with elimination of alcohol. However, it is only possible with this technique to prepare comparatively unstable α-aminosiloxanes and also only in difunctional telechelic form.

Highly viscous polysiloxanes can also be obtained by polyaddition reactions, as described in U.S. Pat. No. 5,241,034 and U.S. Pat. No. 6,252,100. EP-A 874 017 and U.S. Pat. No. 6,451,909 disclose polyaddition reactions in emulsion for the preparation of highly viscous polysiloxanes. However, it is common to all of these polyaddition methods that metal catalysts are required for the progress of the reaction and are often undesired. In the presence of N-containing sil(ox)anes, inhibition effects also occur, so that it is barely possible, if at all, to carry out an efficiently catalysed polyaddition.

SUMMARY OF THE INVENTION

It is therefore an object of the invention to provide a process for preparing emulsions of highly viscous organopolysiloxanes which contain Si—C-bonded radicals having basic nitrogen, in which the aforementioned disadvantages are avoided and the organopolysiloxanes can be prepared under moderate thermal conditions. It is a further object of the invention to provide emulsions of highly viscous organopolysiloxanes which contain Si—C-bonded radicals having basic nitrogen and which are stable. These and other objects are achieved by the invention.

DETAILED DESCRIPTION OF THE PREFERRED EMBODIMENTS

The invention provides a process for preparing emulsions of highly viscous organopolysiloxanes, characterized in that siloxanes selected from the group of siloxanes (1) composed of units of the general formula $$A_a R_c (OR^1)_d SiO_{\frac{4-(a+c+d)}{2}} \qquad (I)$$

where
A is a monovalent, Si—C-bonded radical having basic nitrogen,
R is a monovalent, optionally substituted hydrocarbon radical having from 1 to 18 carbon atoms per radical,
$R^1$ is a hydrogen atom or an alkyl radical having from 1 to 8 carbon atoms, preferably a hydrogen atom or a methyl or ethyl radical,
a is 0 or 1,
c is 0, 1, 2 or 3 and
d is 0 or 1,
with the proviso that the sum of a+c+d is ≦3 and, on average, at least one A radical and at least one $R^1$ radical in the definition of $R^1$ as a hydrogen atom are present per molecule, siloxanes (2) composed of units of the general formula $$R_c (OR^1)_d SiO_{\frac{4-(c+d)}{2}} \qquad (II)$$

where R, $R^1$, c and d are each as defined above, with the proviso that the sum of c+d is ≦3 and at least one $R^1$ radical in the definition of $R^1$ as a hydrogen atom is present per molecule, and the mixtures of siloxanes (1) and (2), are reacted with silanes (3) of the general formula $$BR_e Si(OR^3)_{3-e} \qquad (III)$$

where
B is a monovalent radical of the formula —$CR^2_2$—Y,
$R^2$ is a hydrogen atom or an alkyl radical having from 1 to 4 carbon atoms, preferably a hydrogen atom,
Y is a monofunctional radical from the group of the halogens, the monosubstituted O and S atoms and the substituted N and P atoms, $R^3$ is an alkyl radical having from 1 to 8 carbon atoms per radical and e is 0, 1 or 2, preferably 0 or 1, in the presence of dispersion medium (4), preferably water, and optionally emulsifiers (5).

The invention further provides emulsions of highly viscous organopolysiloxanes comprising highly viscous organopolysiloxanes composed of units of the general formula $$A_a B_b R_c (OR^1)_d SiO_{\frac{4-(a+b+c+d)}{2}} \quad (IV)$$

where A, B, R, $R^1$, a, c and d are each as defined above, b is 0 or 1, with the proviso that the sum of a+b+c+d is $\leq 3$ and a and b in the same siloxane unit are not simultaneously 1 and that, on average, at least one B radical is present per molecule, dispersion medium (4), preferably water, and optionally emulsifiers (5).

The inventive highly viscous organopolysiloxanes may have a linear, branched or dendrimer-like highly branched structure. The inventive emulsions are preferably aqueous emulsions of highly viscous organopolysiloxanes, and the inventive emulsions are preferably prepared in the presence of emulsifiers (5).

The highly viscous organopolysiloxanes obtained by the process according to the invention are more stable than the organopolysiloxanes obtained by the process described in DE 25 00 020 A which are unstable since the amino groups are readily eliminated thermally and/or in the acidic pH range, which can be observed in a fall in the amine number (The amine number corresponds to the number of ml of 1N HCl which is required to neutralize 1 g of substance.). Furthermore, highly viscous organopolysiloxanes are prepared by the process according to the invention, i.e. the reaction results in an increase in viscosity, which is not possible by the process described in DE 25 00 020 A.

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl, naphthyl, anthryl and phenanthryl radicals; alkaryl radicals such as o-, m-, and p-tolyl radicals, xylyl radicals and ethylphenyl radicals; and aralkyl radicals such as the benzyl radical, and the α- and the β-phenylethyl radicals.

Examples of substituted R radicals are haloalkyl radicals such as the 3,3,3-trifluoro-n-propyl radical, the 2,2,2,2',2',2'-hexafluoroisopropyl radical, the heptafluoroisopropyl radical and haloaryl radicals such as the o-, m- and p-chlorophenyl radicals.

Examples of alkyl radicals $R^1$ are the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical, and isooctyl radicals such as the 2,2,4-trimethyl pentyl radical.

Examples of alkyl radicals $R^2$ are the methyl, ethyl, n-propyl, isopropyl, 1-n-butyl, 2-n-butyl, isobutyl and tert-butyl radicals.

Examples of alkyl radicals $R^1$ are fully applicable to alkyl radicals $R^3$.

The A radical is preferably a radical of the formula $$R^5_2 N-(CHR^2)_n- \quad (V)$$

where $R^2$ is as defined above and is preferably a hydrogen atom, $R^5$ is the same or different and is a hydrogen atom or an alkyl, cycloalkyl or aminoalkyl radical and n is an integer of 2 to 10, preferably 2 to 4, more preferably 3.

Examples of $R^5$ radicals are the examples recited for the R radical alkyl radicals and cycloalkyl radicals in particular, and also aminoalkyl radicals, preference among the aminoalkyl radicals being given to the aminoethyl radical.

Examples of A radicals are 3-aminopropyl, 3-methylaminopropyl, 3-dimethylaminopropyl, 3-diethylaminopropyl, 3-cyclohexylaminopropyl, 3-(2-aminoethyl)aminopropyl, 3-(3-aminopropyl)aminopropyl, 3-(3-dimethylaminopropyl) aminopropyl, 3,3-bis(dimethylaminopropyl)aminopropyl, and also semiacylated forms from reaction with carboxylic acids such as acetic acid, and semiamidated forms from reaction with lactones such as butyrolactone or valerolactone.

Examples of Y radicals are the fluorine, chlorine, bromine or iodine radicals, —OH or —$OR^4$ groups, —SH or —$SR^4$ groups, —$NH_2$, —$NHR^4$ or —$NR^4_2$ groups, and —$PR^4_2$, —$P(OR^4)_2$, and —$PO(OR^4)_2$ groups, where $R^4$ is a monovalent organic radical optionally containing nitrogen and/or oxygen atoms, preferably a monovalent hydrocarbon radical optionally containing nitrogen and/or oxygen atoms and having from 1 to 18 carbon atoms.

Examples of B radicals are hydroxymethyl, methoxymethyl, ethoxymethyl, 2-ethoxyethoxymethyl, 2-butoxyethoxymethyl, acetoxymethyl, mercaptomethyl, ethylthiomethyl, dodecylthiomethyl, aminomethyl, methylaminomethyl, dimethylaminomethyl, diethylaminomethyl, dibutylaminomethyl, cyclohexylaminomethyl, anilinomethyl, 3-dimethylaminopropyl-aminomethyl, bis(3-dimethylaminopropyl)aminomethyl, diethylphosphinomethyl, dibutylphosphinomethyl, and groups of the formulae —$CH_2NHCOR^4$, —$CH_2NHCO_2R^4$ or
—$CH_2NHCONHR^4$, where $R^4$ is as defined above.

B is preferably a radical of the formula —$CH_2NHR^4$ or —$CH_2NR^4_2$, where $R^4$ is as defined above.

Examples of hydrocarbon radicals R are applicable fully to hydrocarbon radicals $R^4$.

The siloxanes (1) used are preferably those of the general formula $$(R^1O)R_2SiO(SiR_2O)_n(SiRAO)_mSiR_2(OR^1) \quad (VI)$$

where A, R and $R^1$ are each as defined above, m is an integer from 1 to 30 and n is 0 or an integer from 1 to 1000, with the proviso that from 25 to 100 mol %, preferably from 50 to 100 mol %, of all $R^1$ radicals are hydrogen atoms.

The siloxanes (2) used are preferably those of the general formula $$(R^1O)R_2SiO(SiR_2O)_pSiR_2(OR^1) \quad (VII)$$

where R and $R^1$ are each as defined above and p is an integer from 1 to 1000.

Particular preference is given to using siloxanes (1). Examples of siloxanes (1) are commercial amine oils having, for example, 3-(2-aminoethyl)aminopropyl functionalities and which contain silanol groups, Examples of siloxanes (2) optionally employed are commercial polydimethylsiloxanes having terminal silanol groups. These compounds are obtainable very inexpensively, which makes the inventive process particularly attractive economically.

Examples of silanes (3) are
2-butoxyethoxymethyltrimethoxysilane,
methoxymethylmethyldiethoxysilane,
diethylaminomethylmethyldimethoxysilane,
dibutylaminomethyltriethoxysilane,
dibutylaminomethyltributoxysilane,
cyclohexylaminomethyltrimethoxysilane,
cyclohexylaminomethyltriethoxysilane,
cyclohexylaminomethylmethyldiethoxysilane,
anilinomethyltriethoxysilane,
3-dimethylaminopropylaminomethyltrimethoxysilane,
acetylaminomethylmethyldimethoxysilane,
ethylcarbamoylmethyltrimethoxysilane,
ethylcarbamoylmethylmethyldimethoxysilane,
diisopropylaminocarbamoylmethylmethyldimethoxysilane and
imidazolylcarbamoylmethylmethyldimethoxysilane.

In the inventive process, silanes (3) are preferably used in amounts of from 0.01 to 10% by weight, more preferably from 0.1 to 2.0% by weight, based in each case on siloxane (1) and siloxane (2).

The inventive emulsions of highly viscous organopolysiloxanes are prepared by intensively mixing with one another siloxanes from the group of the siloxanes (1), siloxanes (2), and silanes (3), dispersion medium (4), preferably water, and optionally emulsifiers (5). Preference is given to using emulsifiers (5).

Technologies for the preparation of emulsions of organopolysiloxanes are known. For instance, the intensive mixing can be effected in rotor-stator stirring apparatus, colloid mills or in high-pressure homogenizers.

Even though the silanes (3) contain groups which are known to be hydrolysis-sensitive, particularly when $R^3$ is a methyl or ethyl radical, highly viscous organopolysiloxanes are surprisingly obtained even in the presence of water by condensation of a plurality of siloxanes (1) or/and siloxanes (2).

The method of mixing the components which are used to prepare the inventive emulsions is not very critical and can be practiced in various sequences. Depending on the components (1), (2), (3), (4) and (5), preferred procedures may, though, arise, and should be tested in the individual case.

It is possible, for example, to premix components (1) and/or (2) and (3) with one another, then to add the emulsifier(s) (5) and then to incorporate the dispersion medium (4). It is also possible to meter components (1) to (5) in sequence into the emulsification apparatus. In particular cases, it may be advantageous, for example owing to the siloxane viscosity or reactivity, to mix silane (3) with siloxane (1) and then to incorporate siloxane (2), or vice versa, according to how more favorable rheological properties for processing of the components arise.

In the case of very reactive silanes (3), it may be advantageous first to admix component (1) and/or (2) with emulsifier (5) and the dispersion medium (4) to form a stiff phase, and then to meter in the silane (3) before a phase reversal and hence, for example, an oil-in-water emulsion is obtained.

In the process of the invention, dispersion medium (4), preferably water, is preferably used in amounts of from 40 to 900% by weight, more preferably from 100 to 600% by weight, based in each case on the total weight of siloxanes (1) and/or (2) and silanes (3).

In the process according to the invention, the emulsifiers (5) may be any suitable ionic or nonionic emulsifiers, either individually or as mixtures of different emulsifiers, with which it is possible to date to prepare aqueous emulsions of organopolysiloxanes.

Examples of anionic emulsifiers are:

1. Alkyl sulfates, particularly those having a chain length of from 8 to 18 carbon atoms, alkyl and alkaryl ether sulfates having from 8 to 18 carbon atoms in the hydrophobic radical and from 1 to 40 ethylene oxide (EO) or propylene oxide (PO) units.

2. Sulfonates, particularly alkylsulfonates having from 8 to 18 carbon atoms, alkylarylsulfonates having from 8 to 18 carbon atoms, taurides, esters and monoesters of sulfosuccinic acid with monohydric alcohols or alkylphenols having from 4 to 15 carbon atoms; these alcohols or alkylphenols may optionally also be ethoxylated with from 1 to 40 EO units.

3. Alkali metal and ammonium salts of carboxylic acids having from 8 to 20 carbon atoms in the alkyl, aryl, alkaryl or aralkyl radical.

4. Phosphoric partial esters and their alkali metal and ammonium salts, particularly alkyl and alkaryl phosphates having from 8 to 20 carbon atoms in the organic radical, alkyl ether phosphates or alkaryl ether phosphates having from 8 to 20 carbon atoms in the alkyl or alkaryl radical and from 1 to 40 EO units.

Examples of nonionic emulsifiers are:

5. Polyvinyl alcohol which also has from 5 to 50%, preferably from 8 to 20% vinyl acetate units, with a degree of polymerization of from 500 to 3000.

6. Alkyl polyglycol ethers, preferably those having from 8 to 40 EO units, and alkyl radicals of from 8 to 20 carbon atoms.

7. Alkylaryl polyglycol ethers, preferably those having from 8 to 40 EO units, and from 8 to 20 carbon atoms in the alkyl and aryl radicals.

8. Ethylene oxide/propylene oxide (EO/PO) block copolymers, preferably those having from 8 to 40 EO or PO units.

9. Addition products of alkylamines having alkyl radicals of from 8 to 22 carbon atoms with ethylene oxide or propylene oxide.

10. Fatty acids having from 6 to 24 carbon atoms.

11. Alkylpolyglycosides of the general formula $R^*$-O-$Z_o$, in0 which $R^*$ is a linear or branched, saturated or unsaturated alkyl radical having an average of 8-24 carbon atoms and $Z_o$ is an oligoglycoside radical having an average of o=1-10 hexose or pentose units, or mixtures thereof.

12. Natural substances and derivatives thereof, such as lecithin, lanolin, saponins, cellulose; cellulose alkyl ethers and carboxyalkylcelluloses, whose alkyl groups each have up to 4 carbon atoms.

13. Linear organo(poly)siloxanes containing polar groups, especially those having alkoxy groups having up to 24 carbon atoms and/or up to 40 EO and/or PO groups.

Examples of cationic emulsifiers are:

14. Salts of primary, secondary and tertiary fatty amines having from 8 to 24 carbon atoms with acetic acid, sulfuric acid, hydrochloric acid and phosphoric acids.

15. Quaternary alkyl- and alkylbenzeneammonium salts, especially those whose alkyl groups have from 6 to 24 carbon atoms, especially the halides, sulfates, phosphates and acetates.

16. Alkylpyridinium, alkylimidazolinium and alkyloxazolinium salts, especially those whose alkyl chain has up to 18 carbon atoms, especially the halides, sulfates, phosphates and acetates.

Suitable ampholytic emulsifiers are particularly:

17. Long-chain-substituted amino acids such as N-alkyl-di(aminoethyl)glycine or N-alkyl-2-aminopropionic salts.

18. Betaines, such as N-(3-acylamidopropyl)-N,N-dimethyl-ammonium salts with a $C_8$-$C_{18}$-acyl radical, and alkylimidazolium betaines.

Preferred emulsifiers are nonionic emulsifiers, especially the alkyl polyglycol ethers listed under 6.

In the process inventive, the emulsifiers (5) are preferably used in amounts of from 0.5 to 50% by weight, more preferably from 2 to 25% by weight, based on the total weight of siloxanes (1) and/or (2) and silanes (3).

The process is preferably carried out at temperatures below 100° C., more preferably at from 10 to 70° C., most preferably at from 15 to 40° C, and at the pressure of the surrounding atmosphere. Higher or lower pressures may be used as well.

The highly viscous organopolysiloxanes preferably have viscosities of from 10,000 mPa·s to 50,000,000 mPa·s at 25° C., more preferably from 50,000 mPa·s to 5,000,000 mPa·s at 25° C. and most preferably from 110,000 mPa·s to 10,000,000 mPa·s at 25° C.

The emulsions may be prepared as emulsions of undiluted highly viscous organopolysiloxanes, but it is sometimes recommended for handling reasons to dilute with organic solvents or low-viscosity oligomers/polymers, preferably with siloxanes such as dimethylpolysiloxanes. Based on the total weight of siloxanes (1) and/or (2) and silanes (3), these diluent additives are preferably used in amounts from 10 to 1000% by weight, more preferably from 20 to 100% by weight.

Should, conversely, particularly low-flowing consistencies be desired from a use point of view, the highly viscous organo-polysiloxanes can also be prepared in the presence of resins and/or resinous additives. Suitable organic resins are those such as hydrocarbon resins, polyacrylate resins or polyurethane resins, and also polysiloxane resins such as MQ resins, MTQ resins, MDT resins and MDQ resins, and also cubic siloxane compounds which are known under the name POSS (polyhedral oligomeric silsesquioxanes).

Examples of MQ resins are those formed from units of the formula

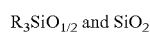

$R_3SiO_{1/2}$ and $SiO_2$ where R is as defined above, preferably a methyl radical, and the units of the formula $R_3SiO_{1/2}$ may be the same or different. The ratio of units of the formula $R_3SiO_{1/2}$ to units of the formula $SiO_2$ is preferably from 0.6 to 2.0.

The abovementioned resin additives are preferably used in amounts of from 0.1 to 100% by weight, more preferably from 10 to 80% by weight, based on the total weight of siloxanes (1) and/or (2) and silanes (3).

Examples of organic solvents are toluene, n-hexane, n-heptane and techn. benzine fractions.

Depending on the use of di- or trialkoxysilane (3) and linear or branched siloxane (1) and/or (2), the highly viscous organopolysiloxanes may likewise have linear, branched or even highly branched structures.

Dialkoxysilanes (3) form, from the preferred siloxanes of the formulae (VI) or (VII), typically linear highly viscous organopolysiloxanes whose end viscosity depends both on the chain lengths of the siloxanes (1) or/and (2) and on the stoichiometry of the SiOH and $SiOR^3$ groups which react with one another. The highest viscosities are achieved when equal numbers of the reactive groups react with one another. Losses resulting from volatility or side reactions can require a stoichiometric ratio deviating from 1.0:1.0 for this purpose.

When siloxanes of the formulae (VI) or (VII) which have less than 100% of their $R^1$ groups defined as hydrogen are used, shorter chain lengths are obtained, since alkoxy groups present bring about a chain end stoppage.

The use of trialkoxysilanes (3) leads to branched siloxane polymers whose degree of branching depends upon factors including how many silanes (3) have been incorporated per highly viscous organopolysiloxane molecule obtained. At an $SiOR^3$/SiOH quotient of <0.2, the degree of branching of the resulting polymers is low. However, it increases as the quotient likewise rises. The $SiOR^3$/SiOH quotient required to obtain liquid polymer products of a certain target viscosity can be determined experimentally in a simple manner.

Monofunctional monoalkoxysilane reacts as a chain end stopper and can be used when it is desired that "B" groups should be at the end of siloxane chains.

In the case that stable end products with regard to their viscosity are desired, an $SiOR^3$/SiOH quotient of not more 1.0 should be selected. Polysiloxane condensates which contain excess $SiOR^3$ groups have the risk of hydrolytic conversion reactions with subsequent condensation and hence the change in the average molecular weight.

The process according to the invention has the advantage that it proceeds without addition of catalysts, in particular without addition of metal catalysts. The reaction of (1) and/or (2) with (3) preferably proceeds to completion in from a few minutes up to several hours, and methoxysilanes react more rapidly than ethoxysilanes here too. However, the condensation may be accelerated by acids and bases, but this is not preferred.

The alcohols obtained as condensation by-products in the process according to the invention may remain in the product or else be removed, for example by distillation under reduced pressure or by extraction.

EXAMPLE 1

In a Turrax emulsifying unit (from Janke & Kunkel), a stiff emulsifier mixture is prepared from 9.38 g of isotridecyl decaethoxylate, commercially available under the trade name Lutensol TO 10 (from BASF), 3.90 g of castor oil ethoxylate G 1300 (from Atlas) and 4.55 g of water, to which 125.28 g of a freshly prepared homogeneous polymer/silane mixture composed of 124.63 g of PDMS A (polydimethylsiloxanediol having a content of terminal OH groups of 765 ppm by weight) and 0.86 g of N-morpholylmethylmethyldiethoxysilane are added by metered addition. The mixture is then diluted with a total of 106.65 g of water in portions to obtain a stable emulsion having an average particle size of 275 nm. The silicone content of the emulsion is 50%.

Concentration of the emulsion by evaporation after a standing time of 24 h/25° C. and reextraction of the siloxane polymer with n-heptane, after evaporation of the solvent, affords a highly viscous polysiloxane having a viscosity of 3400 Pa·s (25° C.). The viscosity of the PDMS A used was increased to 170 times the value in the dispersed phase by the process described.

EXAMPLE 2

Successively in a dissolver, 15.33 g of a molten nonionic emulsifier based on polyethylene glycol, which is commercially available under the trade name Arlypon SA 4D (from Grünau), 70.95 g of deionized water and finally 9.05 g of a 10% solution of a nonionic emulsifier based on polyethylene glycol, which is commercially available under the trade name Arlypon SA 20 (from Grünau), are homogenized with one another in water. Thereafter, 177.37 g of a mixture of 373.89 g of PDMS A (described in Example 1) and 2.15 g of N-morpholylmethylmethyldiethoxysilane, which had been homogenized beforehand, are added in three portions. Addition of 42.23 g of water gives rise to a creamy stiff phase which is diluted further with another two portions of the same amount of water. The fine creamy emulsion contains a siloxane fraction of 44.4%; the solids content is 49.4%. The emulsion has a viscosity of 68 Pa·s (25° C.) at 2.5 rpm. After 24 hours, the siloxane polymer is precipitated with acetone and washed. The dried highly viscous polysiloxane has a viscosity of 3800 Pa·s (25° C.) and hence 190 times the value of the polymer used originally.

EXAMPLE 3

Example 2 is repeated, except that, instead of the mixture of PDMS A and morpholylsilane, 118.23 g of pure PDMS A (described in Example 1) in three portions, and then 59.14 g of a solution of 1.73 g of cyclohexylaminomethylmethyldiethoxysilane in 150.00 g of a silicone oil of viscosity 350 mPa·s (25° C.) are added in two portions. There follows the identical dilution with water.

With the same silicone and solids content, the emulsion has a viscosity of 31 Pa·s (25° C.) at 2.5 rpm. After 5 days/50° C., the emulsion shows no change.

The siloxane polymer mixture which has been precipitated and washed with acetone has, after drying, a viscosity of 510 Pa·s (25° C.), compared to 5.5 Pa·s (25° C.) of a fresh mixture of PDMS A, silicone oil and silane of the same amounts as above.

EXAMPLE 4

A laboratory dissolver is initially charged with 223.73 g of a pre-emulsion composed of 161.91 g of molten Arlypon SA 4D (from Grünau), 749.33 g of deionized water and 95.54 g of a 10% solution of Arlypon SA 20 (from Grünau) in water. A total of 277.49 g of a fresh mixture of 200 g of PDMS A (described in Example 1), 100 g of a copolymer of 3-(2-aminoethylamino)propylmethylsiloxy and dimethylsiloxy units having an amine number of 0.145, a viscosity of 4700 mm²/s (at 25° C.) and an end group ratio of OH/OMe=54/46, and 1.12 g of cyclohexylamino-methylmethyldiethoxysilane are then added in three portions. After addition of 99.12 g of water, a creamy stiff phase is obtained, which, after metered addition of twice the amount of water, gives rise to an emulsion with silicone content 34.7% and a viscosity of 28 Pa·s (25° C.) at 2.5 rpm. The emulsion is unchanged after 5 days/50° C.

The siloxane polymer which has been precipitated and washed with acetone has, after drying, a viscosity of 630 Pa·s (25° C.) compared to 12.4 Pa·s (25° C.) of a fresh mixture of the same amount of PDMS A, amine oil and silane.

EXAMPLE 5

To prepare a microemulsion of an amine-containing linear high molecular weight polymer, a homogeneous emulsifier mixture is first prepared from 15.08 g of diethylene glycol monobutyl ether, 33.44 g of Lutensol TO 5 (from BASF), 27.40 g of deionized water, 3.02 g of Marlipal ST 1618/25 (from Sasol GmbH, Marl) and 0.77 g of 80% acetic acid.

A fresh solution of 0.43 g of cyclohexylaminomethylmethyl-diethoxysilane in 100 g of the amine oil used in Example 4 is stirred into this premixture and then diluted slowly with 119.68 g of deionized water. This gives a low-viscosity transparent microemulsion.

After 24 hours, the viscosity of the amine oil formed by poly-condensation was determined as follows: the microemulsion is first dried, then extracted repeatedly with ethanol. In spite of this, it was not possible to obtain the siloxane polymer completely free of emulsifiers (detection of —CH₂CH₂O groups in the ¹H NMR).

The dried amine oil had a viscosity of approx. 90 Pa·s (25° C.) and hence about 20 times the value based on the oil used.

EXAMPLE 6

Example 5 is repeated with the modification that 0.32 g of the trifunctional cycloaminemethyltriethoxysilane is now used instead of the diethoxysilane.

The viscosity estimation of the branched, high molecular weight polymeric amine oil with low emulsifier content obtained within 24 hours gives a value of approx. 800 Pa·s (25° C.). The polycondensation process thus leads to about 170 times the value. The polymer exhibits the structural viscosity typical for branched siloxanes of a large segment length (on average 420 siloxy units).

The invention claimed is:

1. A process for preparing emulsions of highly viscous organopolysiloxanes having a viscosity of at least 10,000 mPa·s, comprising reacting
    siloxanes (1) comprising units of the formula

where
    A each independently is a monovalent, Si—C-bonded radical having basic nitrogen,
    R is each independently a monovalent, optionally substituted hydrocarbon radical having from 1 to 18 carbon atoms per radical,
    R¹ are each independently a hydrogen atom or an alkyl radical having from 1 to 8 carbon atoms,
    a each independently is 0 or 1,
    c each independently is 0, 1, 2 or 3 and
    d each independently is 0 or 1,
with the proviso that the sum of a+c+d is ≦3 and, on average, at least one A radical and at least one R¹ radical where R¹ is a hydrogen atom are present per molecule, siloxanes (2) composed of units of the formula

where R, R¹, c and d are each as defined above, with the proviso that the sum of c+d is ≦3 and at least one R¹ radical where R¹ is a hydrogen atom are present per molecule,
    or a mixture of siloxanes (1) and (2),
    with silanes (3) of the formula

where
    B each independently is a monovalent radical of the formula —CR²₂—Y,
    R² each independently is a hydrogen atom or an alkyl radical having from 1 to 4 carbon atoms, Y each independently is a monofunctional radical selected from the group consisting of the halogens, monosubstituted O and S atoms, and substituted N and P atoms, $R^3$ each independently is an alkyl radical having from 1 to 8 carbon atoms per radical and e is 0, 1 or 2, in the presence of dispersion medium (4) and optionally emulsifiers (5).

2. The process of claim 1 wherein $R^1$ is hydrogen, methyl, or ethyl and $R^2$ is hydrogen.

3. The process of claim 1, wherein the dispersion medium (4) is water.

4. The process of claim 1, wherein the highly viscous organopolysiloxanes have a viscosity of from 110,000 to 50,000,000 mPa·s at 25° C.

5. The process of claim 1, wherein the A radical is a radical of the formula $$R^5_2N-(CHR^2)_n- \tag{V}$$

where $R^5$ each independently is a hydrogen atom or an alkyl, cycloalkyl or aminoalkyl radical and n is an integer from 2 to 10.

6. The process of claim 5, wherein $R^2$ is hydrogen.

7. The process of claim 1, wherein the A radical is a 3-(2-aminoethyl)aminopropyl radical.

8. The process of claim 1, wherein the A radical is a 3-aminopropyl radical.

9. The process of claim 1, wherein the B radical is a radical of the formula —$CH_2NHR^4$ or —$CH_2NR^4_2$, where $R^4$ is a monovalent hydrocarbon radical optionally containing nitrogen and/or oxygen atoms and having from 1 to 18 carbon atoms.

10. The process of claim 1, wherein the siloxanes (1) are those of the formula $$(R^1O)R_2SiO(SiR_2O)_n(SiRAO)_mSiR_2(OR^1) \tag{VI}$$

where m is an integer from 1 to 30 and n is 0 or an integer from 1 to 1000, with the proviso that at least one $R^1$ radical where $R^1$ is a hydrogen atom is present per molecule.

11. The process of claim 1, wherein the siloxanes (2) are those of the formula $$(R^1O)R_2SiO(SiR_2O)_pSiR_2(OR^1) \tag{VII}$$

where p is an integer from 1 to 1000.

12. The process of claim 1, wherein emulsions of highly viscous organopolysiloxanes are prepared in the presence of organic resins, polysiloxane resins, or mixtures thereof.

13. An emulsion of highly viscous organopolysiloxanes prepared by the process of claim 1 and comprising highly viscous organopolysiloxanes comprising units of the formula $$A_aB_bR_c(OR^1)_dSiO_{\frac{4-(a+b+c+d)}{2}} \tag{IV}$$

where b is 0 or 1, with the proviso that the sum of a+b+c+d is ≦3 and a an b in the same unit are not simultaneously 1, on average, at least one B radical is present per molecule, and the highly viscous organopolysiloxanes have a viscosity of 110,000 to 50,000,000 mPa·s at 25° C.

14. The emulsion of claim 13, wherein water is used as dispersion medium (4).

15. The emulsion of claim 13, wherein the A radical is a radical of the formula $$R^5_2N-(CHR^2)- \tag{V}$$

where $R^5$ is the same or different and is a hydrogen atom or an alkyl, cycloalkyl or aminoalkyl radical and n is an integer from 2 to 10.

16. The emulsion of claim 13, wherein the B radical is a radical of the formula —$CH_2NHR^4$ or —$CH_2NR^4_2$, where $R^4$ is a monovalent hydrocarbon radical optionally containing nitrogen and/or oxygen atoms and having from 1 to 18 carbon atoms.

17. The emulsion of claim 15, wherein the radical $R^2$ of the formula (V) is hydrogen.

* * * * *